United States Patent [19]
Inoue

[11] Patent Number: 5,196,975
[45] Date of Patent: Mar. 23, 1993

[54] MAGNETIC DISK APPARATUS HAVING HEAD ARM ELASTICALLY SUPPORTED ON HEAD CARRIAGE

[75] Inventor: Kazuhiko Inoue, Houya, Japan
[73] Assignee: TEAC Corporation, Japan
[21] Appl. No.: 638,054
[22] Filed: Jan. 4, 1991

[30] Foreign Application Priority Data
Oct. 30, 1990 [JP] Japan .................................. 2-293443
Nov. 9, 1990 [JP] Japan .................................. 2-305783

[51] Int. Cl.⁵ .......................... G11B 5/54; G11B 21/22
[52] U.S. Cl. .................................................. 360/105
[58] Field of Search ..................... 360/104, 105, 106

[56] References Cited

U.S. PATENT DOCUMENTS 4,922,356 5/1990 Yamaguchi et al. ................ 360/104
5,051,854 9/1991 Iwaraga ............................... 360/105

FOREIGN PATENT DOCUMENTS 0047959 4/1981 Japan ................................... 360/105
130968 7/1988 Japan .
56886 8/1988 Japan .
1-65467 3/1990 Japan .

Primary Examiner—David J. Severin
Attorney, Agent, or Firm—Andrus, Sceales, Starke & Sawall

[57] ABSTRACT

A head carriage apparatus includes an upper arm provided with a magnetic head and a head carriage main unit that supports the upper arm in the state where it can be displaced in the upwards and downwards direction. The head carriage apparatus also includes an engagement member that engages with the upper arm when the upper arm is displaced by a predetermined amount in the upwards direction and around the center of displacement formed by the position of support to the head carriage main unit, wherein the upper arm is rotationally displaced further around the center of displacement formed by the engagement position of this engagement member and the upper arm.

11 Claims, 6 Drawing Sheets

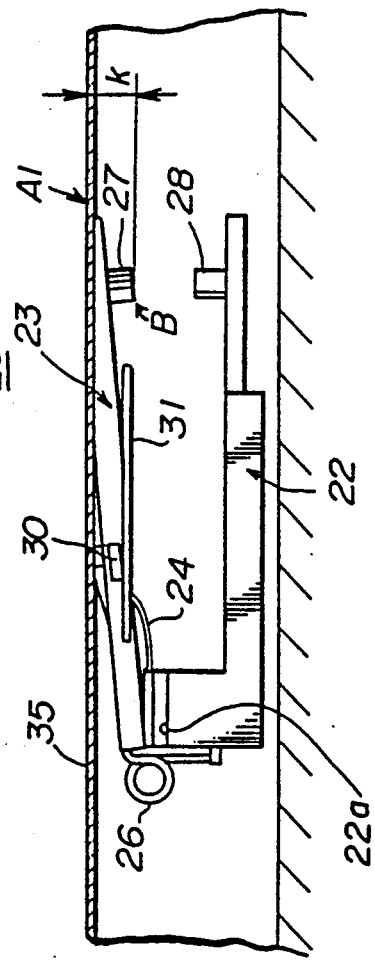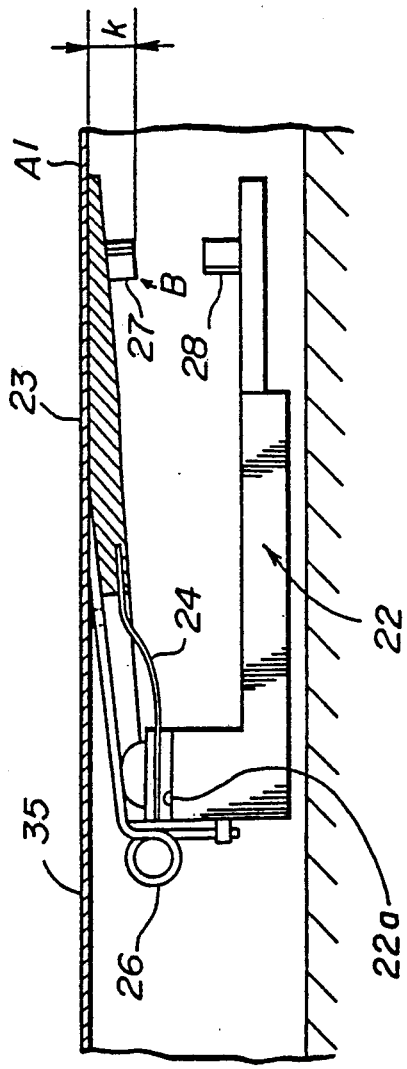

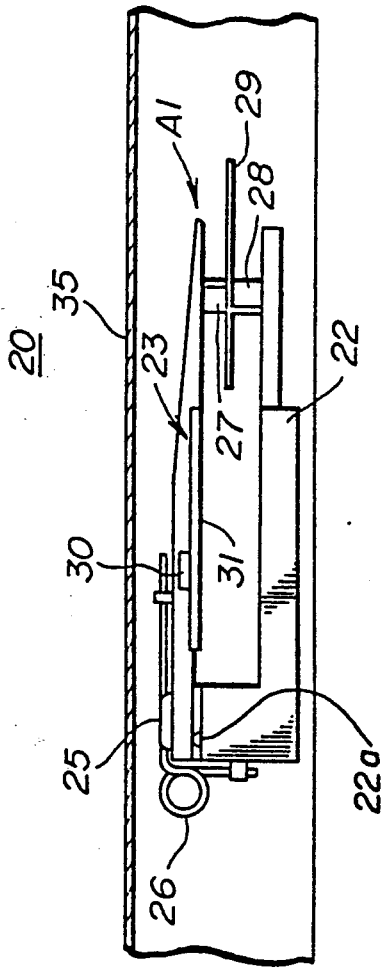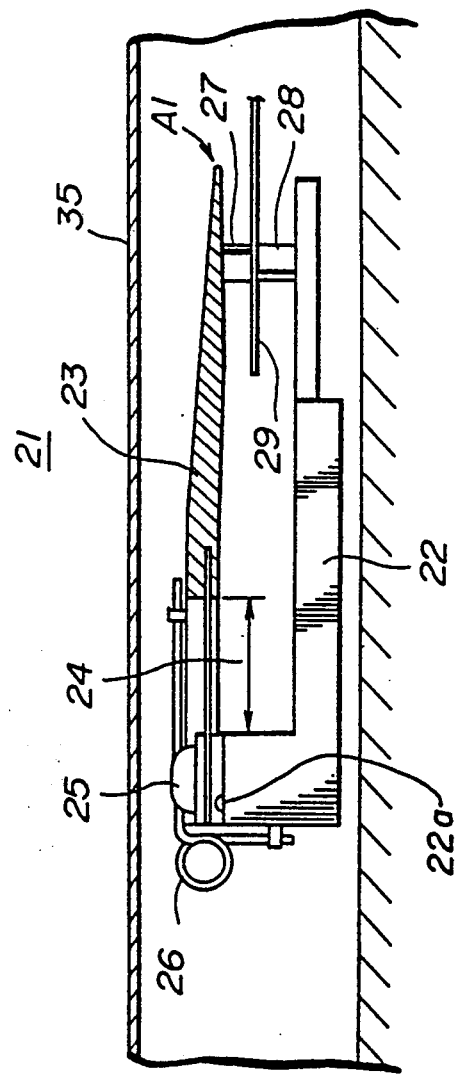

MAGNETIC DISK APPARATUS HAVING HEAD ARM ELASTICALLY SUPPORTED ON HEAD CARRIAGE

BACKGROUND OF THE INVENTION

The present invention relates to a head carriage apparatus, and more particularly, to a head carriage apparatus where a magnetic head is in moving contact with a recording medium according to a displacement of an upper arm.

In general, magnetic disk apparatus that use flexible magnetic disks as the recording medium have a head carriage apparatus. This head carriage apparatus is provided internal to a magnetic disk apparatus, and has a configuration where there is movement in the direction of the diameter of a magnetic disk. Accordingly, the head carriage apparatus can move the magnetic head to an arbitrary position on the magnetic disk.

FIG. 1 shows a conventional head carriage apparatus. As is shown in the figure, a head carriage apparatus 1 has a configuration comprising a head carriage main unit 2 and an upper arm 3. The upper arm 3 is connected with the head carriage main unit 2 by a leaf spring 4 to form a single unit. In addition, the numeral 5 denotes a head load spring, which urges the upper arm 3 in the clockwise direction shown in the diagram.

Furthermore, to the side portion of the upper arm 3 is formed a protrusion 3a and to the lower portion of the protrusion 3a is formed a bale 6. This bale 6 is formed as one portion of a disk holder, and accordingly, rises and falls in accordance with the insertion and removal of a magnetic disk 7 (housed in a disk cartridge). Magnetic heads 8,9 are provided so as to oppose the lower portion of the upper arm 3 and the upper portion of the head carriage main unit 2. Moreover, the numeral 10 in the figure is a chassis, and the numeral 11 is a cover that covers the upper portion of the chassis 10. The head carriage apparatus 1 having the configuration described above, is configured so that the upper arm 3 rotationally displaces when the bale 6 rises. More specifically, when the magnetic disk 7 is mounted and dismounted, the rising of the bale 6 causes the protrusion 3a to lift, so that the upper arm 3 rotates in the counterclockwise direction.

When a conventional head carriage apparatus 1 has the upper arm 3 rotationally displaced as described above, the upper arm 3 is in the state where it forms a relatively large angle $\theta 1$ with respect to the horizontal direction (with the upper arm 3 having the inclined state shown in FIG. 1).

In a conventional head carriage apparatus 1 having the configuration described above, the upper arm 3 is in the state where it is inclined at the relatively large angle $\theta 1$ with respect to the horizontal direction when the magnetic disk 7 is mounted and dismounted. Accordingly, the magnetic head 8 mounted to the upper arm 3 is also in an inclined state accompanying this movement.

In addition, the angle of inclination of the upper arm 3 must be such that the lowest position of the inclined magnetic head 8 is at a position higher than the position at which the magnetic disk 7 is inserted and removed. If it not set in this manner, then the magnetic disk 7 will strike the magnetic head 8 when the magnetic disk 7 is inserted and removed.

Accordingly, in the conventional head carriage apparatus 1, it is necessary to have a large angle of inclination for the upper arm 3 and because of this, it is necessary to have a large space for the rotation of the upper arm 3. This serves to increase the size of the magnetic disk 7 and to create a problem in making it more compact. In the example shown in FIG. 1, it is necessary to have a space with the height indicated by the arrow L inside the magnetic disk 7 so that the upper arm 3 can be rotated.

SUMMARY OF THE INVENTION

With respect to this problem, the present invention has as an object the provision of a practical head carriage apparatus which is novel, and in which the problem described above is eliminated.

Another object of the present invention is to provide a head carriage apparatus that enables the magnetic disk apparatus to be made more compact.

Still another object of the present invention is to provide a magnetic disk apparatus having a configuration comprising an upper arm provided to a magnetic head and a head carriage main unit that supports this upper arm in the state where it can be displaced in the upwards and downwards directions, and further comprising an engagement member that engages with said upper arm when said upper arm is displaced by a predetermined amount in the upwards direction and around the center of displacement formed by the position of support to the head carriage main unit, so that the upper arm is rotationally displaced further around the center of displacement formed by the engagement position of this engagement member and said upper arm.

Still another object of the present invention is to provide a head carriage apparatus wherein an upper arm provided with a magnetic head is mounted to a head carriage main unit via a plate spring so that said upper arm is held in a state where it can be displaced in the upwards and downwards directions, and wherein said plate spring is easily deformable and so that when said upper arm rotates by a predetermined amount in the upwards direction and around the center of rotation formed by the support position to the head carriage main unit, an engagement member engaging with said upper arm is provided and flexible deformation of said plate spring causes the upper arm to rotational displace further around the center of rotation formed by the position of engagement of the upper arm and the engagement member.

In a head carriage apparatus having the configuration described above, when the upper arm moves upwards, the upper arm is first displaced in the upwards direction around the center of rotation formed by the position where it is supported to the upper arm in the same manner as in the conventional apparatus.

Then, when it has been displaced upwards by a required amount, the upper arm engages with the engagement member and the displacement is regulated around said support position. After this, the upper arm is rotationally displaced around the center formed by the position of engagement between the upper arm and the engagement member. When this occurs, the plate spring disposed between the upper arm and the head carriage main unit is easily deformed so that there is the smooth rotation of the upper arm about the center formed by said position of engagement.

Thus, the upper arm assumes the state where it is almost horizontal when compared to the conventional configuration and accompanying this, the magnetic head provided to the upper arm is also in a state where it is substantially horizontal. In this manner, it is possible to reduce the inclination of a magnetic head so that it is possible to reduce the amount of displacement of the upper arm by that portion, and therefore enable magnetic disk apparatus having head carriage apparatus to become thinner and more compact.

BRIEF DESCRIPTION OF THE DRAWINGS

FIG. 2A and FIG. 2B are views of a head carriage apparatus of one embodiment according to the present invention;

FIG. 4A and FIG. 4B are views of a head carriage apparatus in the recording and reproduction state;

DESCRIPTION OF THE PREFERRED EMBODIMENTS

The following is a detailed description of preferred embodiments of the present invention, with reference to the appended drawings.

Figure 1:
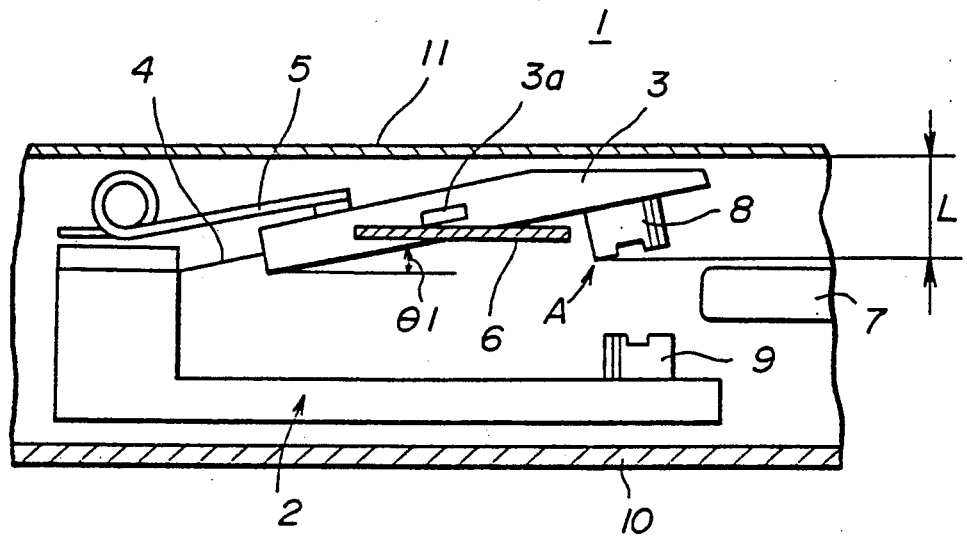
FIG. 1 is a view indicating one example of a conventional head carriage apparatus.
Figure 3:
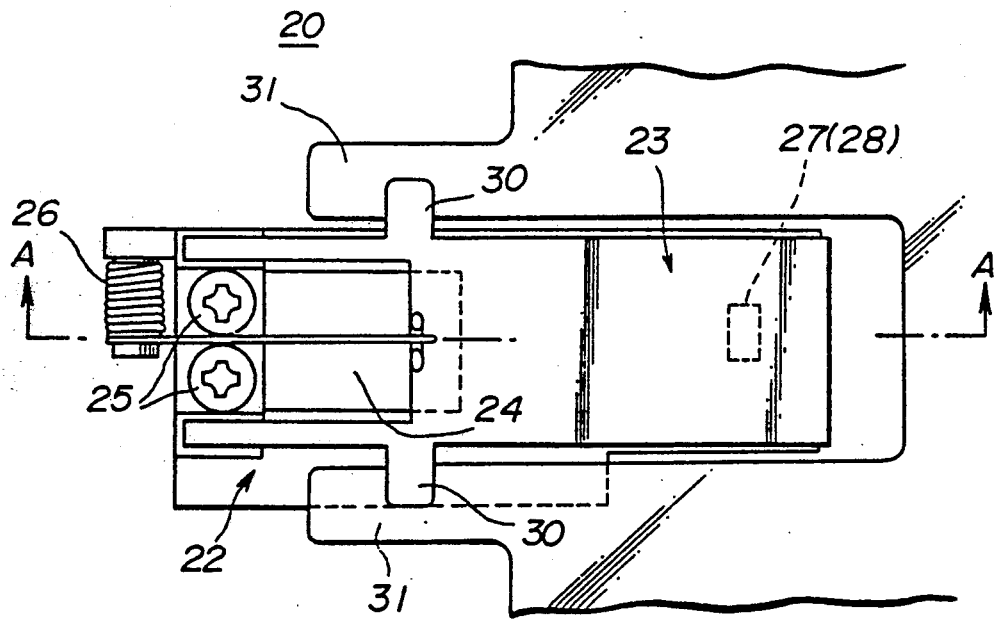
FIG. 3 is a plan view of a head carriage apparatus.
Figure 5A:
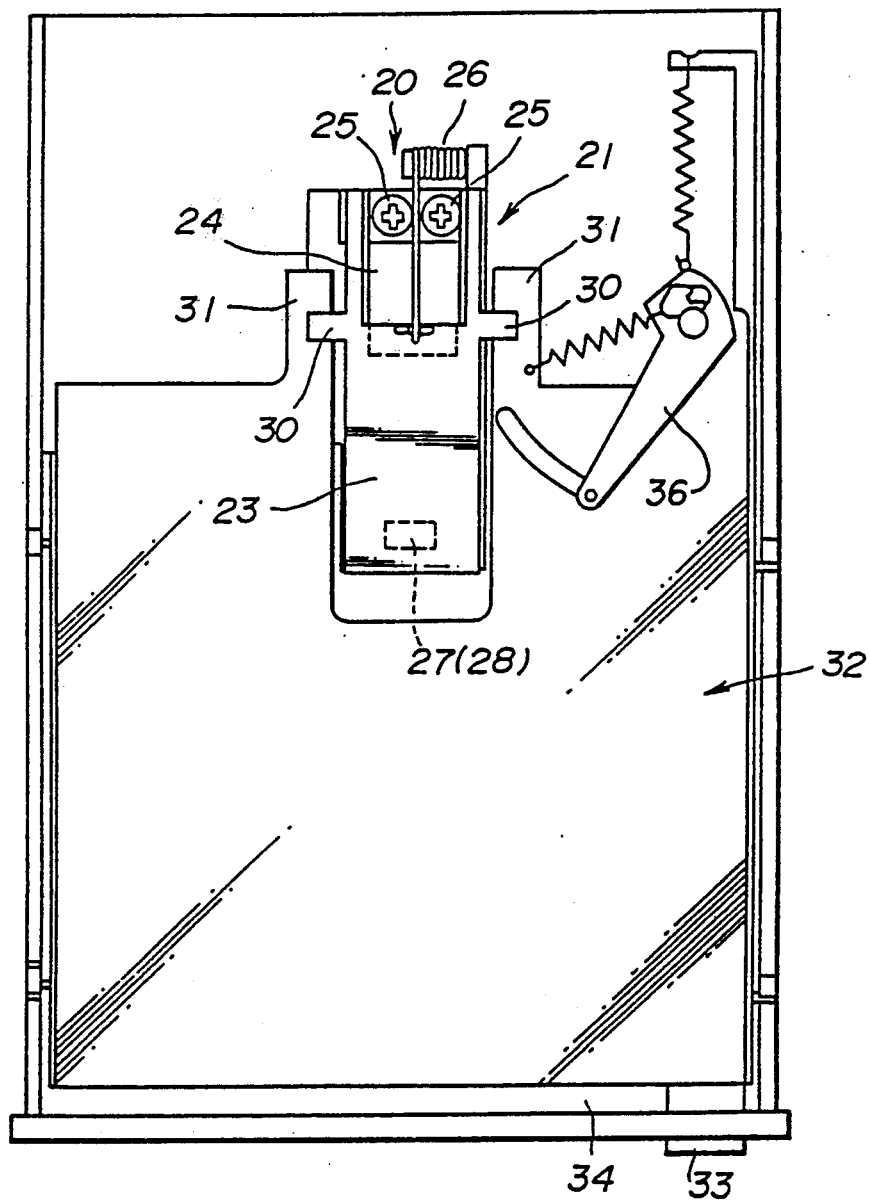
FIG. 5A is a plan view showing the state where a head carriage apparatus is mounted to a magnetic disk.
Figure 5B:
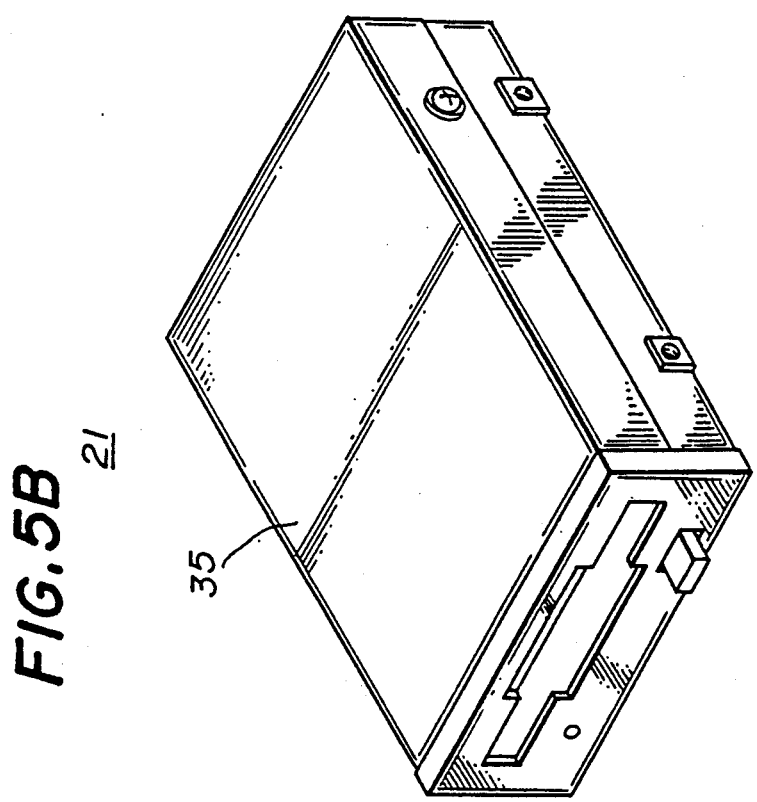
FIG. 5B is an external view of a magnetic disk apparatus to which a head carriage apparatus is mounted.
Figure 6:
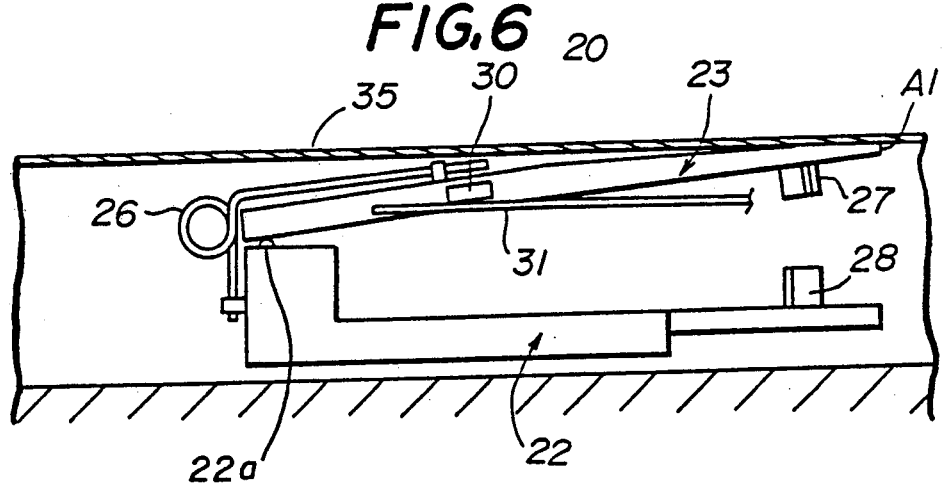
FIG. 6 is a side view showing the state where a distal end portion of an upper arm is engaged with a case.

FIG. 2 through FIG. 6 show a head carriage apparatus 20 according to a first embodiment of the present invention. Moreover, FIG. 2A, FIG. 4A and FIG. 6 are side views of the head carriage apparatus 20, FIG. 3 is a plan view of the head carriage apparatus 20, FIG. 2A and FIG. 4A are sectional views taken along the section line A—A in FIG. 3, and FIG. 5 shows the state where the head carriage apparatus 20 is mounted to the magnetic disk apparatus 21. The head carriage apparatus 20 is provided with a head carriage main body 22 made of resin, and an upper arm 23 also made of resin, and the upper arm 23 is supported and fixed to the head carriage main body 22 via a leaf spring 24. The leaf spring 24 is a plate spring that has a rectangular shape, one end of which is fixed by insert forming to the upper arm 23, and the other end of which is fixed to the upper portion of the head carriage main body 22 by a pair of screws 25. The spring constant of this leaf spring 24 is set to be smaller than the spring constant that is conventionally set, and the length of the flexible portion (shown by the arrow 24 in FIG. 4B) is set so as to be longer (8 mm) when compared to the conventional apparatus. In addition, the dimension of the thickness is also set to be thin, at approximately 0.07 mm.

More specifically, the leaf spring 24 is configured so that it is more easily deformable than in the conventional apparatus. Moreover, the leaf spring 24 is formed from stainless steel, for example. In addition, in the figure, the numeral 26 is a head load spring, which urges the upper arm 23 in the clockwise direction in the drawing. The magnetic heads 27,28 are pressed at a constant pressure by the elastic force of the head load spring 26, towards the magnetic disk 29. To both side portions of the upper arm 23 are formed a pair of protrusions 30 and to the lower portion is engaged a bale 31. This bale 31 is formed as a portion of the disk holder 32, as shown in FIG. 5. A known disk holder 32 is configured with a slider 34, a latch lever 36 and a mechanism to mount and dismount the magnetic disk. The slider 34 is provided with an eject button 33 that is pressed when there is eject operation. In addition, the latch lever 36 engages with the slider 34 when there is eject operation, and regulates the movement of the slider 34. This mounting and dismounting mechanism causes the disk holder 32 to rise and fall when there is mounting and dismounting of the magnetic disk 29 and accompanying this movement, the magnetic disk 29 is positioned at a required position for recording and reproduction.

As has already been described, the bale 31 is formed as one portion of the disk holder 32 and so performs up and down movement by the rise and fall operation of the disk holder 32. In addition, the bale 31 engages with the protrusions 30 that are formed at both side portions of the upper arm 23 and so the upper arm 23 also moves up with the upwards motion of the bale 31. The magnetic heads 27,28 are provided so as to respectively oppose the upper portion of the head carriage main body 22 and the lower portion of the head carriage main body 22, and when there is recording and reproduction, the downwards motion of the bale 31 causes the upper arm 23 to also move down, and as indicated in FIG. 4A and FIG. 4B, are in the state where they hold the magnetic disk 29.

In addition, the numeral 35 in the figure denotes a cover that covers the upper portion of the magnetic disk apparatus 21. This upper portion cover 35 has the normal function of preventing the entry of foreign matter into the inside of the magnetic disk apparatus 21 and also configures one of the major portions of the present invention and which will be described in further detail later, is configured so that it engages at a required position with the upper arm 23 when it is moving upwards. Moreover, FIG. 5B shows the state of the magnetic disk apparatus 21 when the cover 35 is mounted.

Following this is a description of the operation of the head carriage apparatus 20 having the configuration described above.

FIG. 4A and FIG. 4B show the head carriage apparatus 20 in the state where there is recording and reproduction as has been described. In this recording and reproduction, the disk holder 32 moves downwards and accordingly, the upper arm 23 also moves downwards and the pair of magnetic heads 27,28 are in contact with both sides of the magnetic disk 29 the small projection 22a is formed on the head carriage main body 22, shown in FIGS. 2A, 2B, 4A, and 4B at a position at which the upper arm 23 is supported by the head carriage main body 22. In a state in which information is being recorded and reproduced, the upper arm 23 is in contact with the small projection 22a, as shown in FIG. 4A. When this recording and reproduction processing is completed, and eject operation for the magnetic disk 29 commences, the disk holder 32 first rises, and accompanying this, the upper arm 23 urged by the bale 31 also rises. When the upper arm 23 is rising, the upper arm 23 is displaced around the center of displacement formed by a position at which the small projection 22a and the upper arm 23 are in contact with each other (FIG. 6) which is the portion supported by the head carriage main body 22. When this occurs, the leaf spring 24 is flexibly deformed, and the upwards displacement of the upper arm 23 is consequently allowable. The state of the upwards displacement of the upper arm 23 during the time until the upper arm 23 engages with the upper portion cover 35 is not different from that of a conventional apparatus.

As has been described above, when the upper arm 23 is urged by the bale 31 and is displaced upwards, the distal end portion (indicated by reference numeral A1) of the upper arm 23 finally engages with the cover 35 and its upwards motion is regulated (this state is shown in FIG. 6). Moreover, after the distal end A1 of the upper arm 23 has engaged with the upper portion cover 35, the bale 31 still urges the upper arm 23 in the upwards direction. In addition, in the status where the distal end portion of the upper arm 23 is engaged with the upper portion cover 35, the upper arm 23 is in the state where it is inclined, with respect to the horizontal, as shown in the same figure.

On the other hand, the leaf spring 24 that has already been described, is set so that the spring constant is smaller than the spring constant conventionally set, and the length 24 of the flexible portion is also comparatively longer than the conventional length. Accordingly, the leaf spring 24 is more easily deformed than the conventional spring. In this manner, the upper arm 23 is urged by the bale 31 and the leaf spring 24 is easily deformed flexibly so that after the distal end portion A1 has engaged with the upper portion cover 35, the upper arm 23 rotates in the clockwise direction, around the center formed by the point where the distal end portion A1 and the upper portion cover 35 engage. Upper arm 23 separates from small projection 22a, as shown in FIG. 2A.

This rotation of the upper arm 23 around the center formed by the point where the distal end portion A1 and the upper portion cover 35 engage causes the upper arm 23 to have the state where its upper surface is in contact with the upper portion cover 35, as shown in FIG. 2, and the angle with respect to the horizontal direction becomes smaller (in that the status is substantially horizontal). Accompanying this, the inclination of the magnetic head 27 provided to the upper arm 23 also becomes smaller, and accordingly, the distance (shown by the arrow k in FIG. 2A and FIG. 2B) between the inner side surface of the upper portion cover 35 and the lowest end portion (indicated by the arrow B, in the figure) of the magnetic head 27 also becomes smaller. Because of this, it is possible to make the magnetic disk apparatus 21 having the head carriage apparatus 20 more compact.

Figure 7:
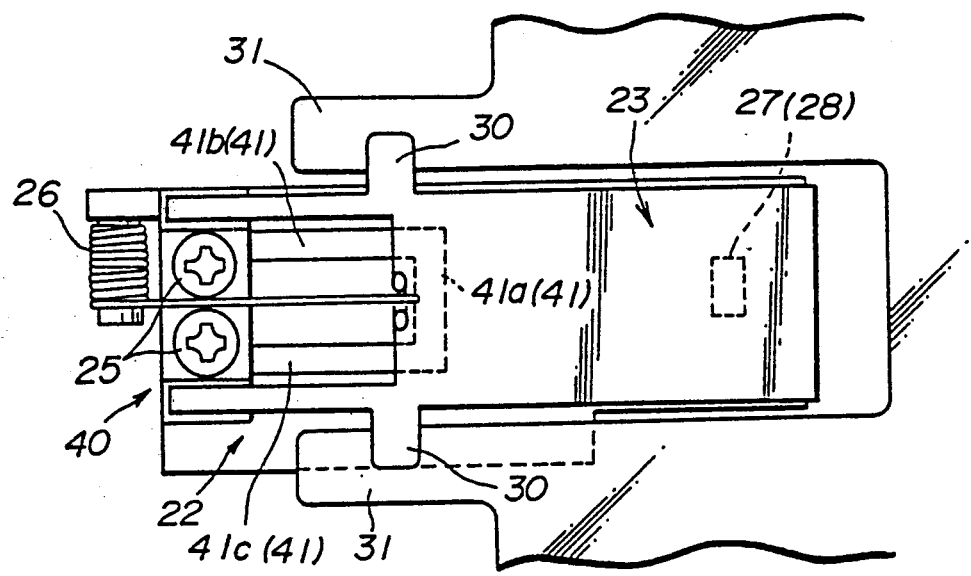
FIG. 7 is a plan view of a head carriage apparatus of a second embodiment according to the present invention.
Figure 8:
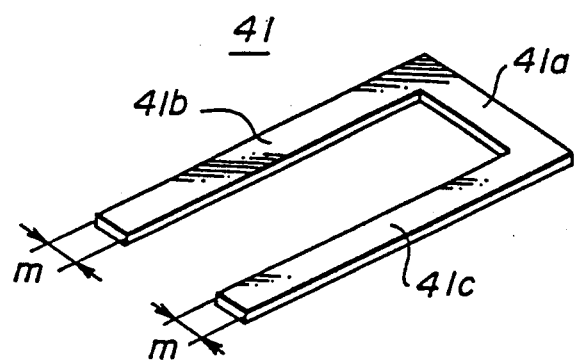
FIG. 8 is an enlarged perspective view showing a leaf spring.

FIG. 7 is a plan view of a head carriage 40 of a second embodiment according to the present invention. Moreover, portions of the head carriage 40 that are the same as corresponding portions of the head carriage apparatus 20 of the first embodiment, are indicated with the same numerals, and the corresponding description of them is omitted. The head carriage 40 shown in FIG. 7 is characterized in that the width dimension is relatively smaller than that of the conventional apparatus because of improved flexibility of the lead spring (plate spring) 41. More specifically, as shown in FIG. 8, it is characterized in that the shape of the leaf spring 41 is a C-shape comprising a base portion 41a and arm portions 41b, 41c. The leaf spring 41 has its base portion 41a insert formed to the upper arm 23 so that it is mounted to the upper arm 23. In addition, in the state where the leaf spring 41 is mounted to the upper arm 23, the arm portions 41b, 41c extend from the downwards end of the upper arm 23 and this distal end portion is fixed to the head carriage main body 22 by the screw 25, as shown in FIG. 7.

Accordingly, when the upper arm 23 moves up and down, the flexible members are the arm portions 41b, 41c of the leaf spring 41. The width dimension of these arm portions 41b, 41c is approximately 2 mm (indicated by the arrow m in the figure), and is 4 mm for both of the arm portions 41b, 41c. In this manner, reducing the width dimension of these arm portions 41b, 41c which are the flexible portions of the leaf spring 41 makes the leaf spring 41 easier to deform so that there is the smooth rotation of the upper arm 23 in the clockwise direction in FIG. 2A, about the center formed by the point of engagement with the upper portion cover 35 described above. Moreover, in the head carriage apparatus 20 having the configuration described above, a complex bending stress with respect to the leaf spring 24 is impressed as shown in FIG. 2A and FIG. 2B but this problem of strength can be eliminated by the selection of a material that is strong with respect to buckling deformation. In addition, the member that engages with the upper arm is not limited to the cover in particular, but can of course be some other member.

What is claimed is:

1. A magnetic disk apparatus for recording and reproducing information to and from a magnetic disk loaded in a housing therefor, said magnetic disk apparatus comprising:

a head carriage unit having a head carriage main body, a leaf spring which is fixed on said head carriage main body at a first end thereof, and an upper arm connected to a second end of said leaf spring; said upper arm being separably supported on said head carriage main body and provided with a magnetic head;

a lift mechanism for performing a first operation for moving said upper arm in an upward direction while a magnetic disk is being loaded and ejected and a second operation for moving said upper arm in a downward direction so that the magnetic head is set on the magnetic disk loaded in said housing; and an engagement member for engaging with said upper arm moved by a predetermined amount in the upward direction by the first operation of said lift mechanism;

wherein after said engagement member is engaged with said upper arm, said upper arm is pivoted, by the further first operation of said lift mechanism, on a point at which said upper arm and said engagement member are engaged with each other, so that said lead spring is elastically deformed.

2. A magnetic disk apparatus as claimed in claim 1, wherein said engagement member is provided on a top cover of said housing of said magnetic disk apparatus.

3. A magnetic disk apparatus as claimed in claim 1, wherein a top cover of said housing of said magnetic disk apparatus is used as said engagement member.

4. A magnetic disk apparatus as claimed in claim 1, wherein said leaf spring has a base part, a first projection part projecting from a first end of said base part, a second projection part projecting from a second end of said base part so as to be approximately parallel to said first projection part, said base part being connected to said upper arm, and ends of said first and second projection parts being fixed on said head carriage main body.

5. A magnetic disk apparatus as claimed in claim 1, wherein said upper arm is pivoted on the point at which said upper arm and said engagement member are engaged with each other so that said upper arm is separated from said head carriage main body at a point at which said upper arm is supported on said head carriage main body.

6. A magnetic disk apparatus as claimed in claim 1, wherein said upper arm is pivoted on the point at which said upper arm and said engagement member are engaged with each other so that said upper arm becomes approximately parallel to the magnetic disk.

7. A magnetic disk apparatus as claimed in claim 1, wherein said leaf spring is flexible so that said upper arm can be easily pivoted on the point at which said upper arm and said engagement member are engaged with each other.

8. A magnetic disk apparatus as claimed in claim 7, wherein said leaf spring has enough width to be flexible.

9. A magnetic disk apparatus as claimed in claim 7, wherein said leaf spring has enough length to be flexible.

10. A magnetic disk apparatus as claimed in claim 7, wherein said leaf spring has enough thickness to be flexible.

11. A magnetic disk apparatus for according and reproducing information to and from a magnetic disk loaded in a housing therefor, said magnetic disk apparatus comprising:
- a head carriage unit having a head carriage main body, a leaf spring which is fixed on said head carriage main body at a first end thereof, and an upper arm connected to a second end of said leaf spring; said upper arm being provided with a magnetic head;
- a lift mechanism for performing a first operating for moving said upper arm in an upward direction while a magnetic disk is being loaded and ejected and a second operation for moving said upper arm in a downward direction so that the magnetic head is set on the magnetic disk loaded in said housing; and
- an engagement member for engaging with said upper arm moved by a predetermined amount in the upward direction by the first operation of said lift mechanism;
- wherein after said engagement member is engaged with said upper arm, said upper arm is pivoted, by the further first operation of said lift mechanism, on a point at which said upper arm and said engagement member are engaged with each other, so that said leaf spring is elastically deformed.

* * * * *

UNITED STATES PATENT AND TRADEMARK OFFICE
CERTIFICATE OF CORRECTION

PATENT NO. : 5,196,975
DATED : March 23, 1993
INVENTOR(S) : Kasuhiko Inoue

It is certified that error appears in the above-identified patent and that said Letters Patent is hereby corrected as shown below:

CLAIM 1, Col. 6, Line 52, delete "lead" and substitute therefor ---leaf---; CLAIM 11, Col. 7, Line 25, delete "according" and substitute therefor ---recording---; CLAIM 11, Col. 8, Line 9, delete "operating" and substitute therefor ---operation.

Signed and Sealed this

Seventh Day of December, 1993

Attest:

BRUCE LEHMAN

Attesting Officer

Commissioner of Patents and Trademarks